United States Patent
Seo et al.

(10) Patent No.: US 10,276,047 B2
(45) Date of Patent: Apr. 30, 2019

(54) APPARATUS AND METHOD FOR ESTIMATING POSITION OF VEHICLE

(71) Applicants: Hyundai Motor Company, Seoul (KR); Kia Motors Corporation, Seoul (KR); Korea University Research and Business Foundation, Seoul (KR)

(72) Inventors: Min Wook Seo, Suwon-si (KR); Dae Hie Hong, Anyang-si (KR); Yun Sik Kim, Seoul (KR)

(73) Assignees: Hyundai Motor Company, Seoul (KR); Kia Motors Corporation, Seoul (KR); Korea University Research and Business Foundation, Seoul (KR)

( * ) Notice: Subject to any disclaimer, the term of this patent is extended or adjusted under 35 U.S.C. 154(b) by 46 days.

(21) Appl. No.: 15/651,948

(22) Filed: Jul. 17, 2017

(65) Prior Publication Data

US 2018/0165960 A1   Jun. 14, 2018

(30) Foreign Application Priority Data

Dec. 14, 2016 (KR) .......................... 10-2016-0170668

(51) Int. Cl.
| | |
|---|---|
| *G08G 1/14* | (2006.01) |
| *G06K 9/00* | (2006.01) |
| *G08G 1/0969* | (2006.01) |
| *B60W 50/00* | (2006.01) |
| *B60W 40/10* | (2012.01) |

(Continued)

(52) U.S. Cl.
CPC .............. *G08G 1/14* (2013.01); *B60W 40/10* (2013.01); *B60W 50/00* (2013.01); *G01C 21/005* (2013.01); *G06K 9/00791* (2013.01); *G06K 9/00812* (2013.01); *G08G 1/0969* (2013.01); *G01C 21/3679* (2013.01); *H04W 84/18* (2013.01)

(58) Field of Classification Search
CPC ........................................................ G08G 1/14
USPC ......................................................... 702/150
See application file for complete search history.

(56) References Cited

U.S. PATENT DOCUMENTS

| | | | | |
|---|---|---|---|---|
| 9,747,797 | B1* | 8/2017 | Ghosh | ..................... G08G 1/144 |
| 2011/0137608 | A1* | 6/2011 | Wang | ..................... G01C 21/20 |
| | | | | 702/150 |

(Continued)

FOREIGN PATENT DOCUMENTS

| | | |
|---|---|---|
| EP | 2 034 449 A1 | 3/2009 |
| JP | 2016-99885 A | 5/2016 |

(Continued)

*Primary Examiner* — Hien D Khuu
(74) *Attorney, Agent, or Firm* — Morgan, Lewis & Bockius LLP

(57) ABSTRACT

A vehicle position estimating apparatus may include a position estimation device that maps objects recognized by a sensor of the vehicle and located around of the vehicle to a parking lot map and estimates a position of the vehicle based on movement information related to the vehicle, a weight setting device that predicts a mapping accuracy of the objects using a detected result of a landmark mapped to the parking lot map by the sensor and gives a weight to each particle corresponding to an interest point of each object based on the predicted mapping accuracy of the objects, and a position correction device that corrects the estimated position of the vehicle using the each weighted particle.

18 Claims, 13 Drawing Sheets

(51) Int. Cl.
    *G01C 21/00*     (2006.01)
    *H04W 84/18*     (2009.01)
    *G01C 21/36*     (2006.01)

(56) References Cited

U.S. PATENT DOCUMENTS

| | | | |
|---|---|---|---|
| 2016/0063861 A1 | 3/2016 | Lee et al. | |
| 2017/0297625 A1* | 10/2017 | Irion | B60W 30/06 |
| 2017/0299400 A1* | 10/2017 | Joung | B60W 50/14 |
| 2018/0095474 A1* | 4/2018 | Batur | G06K 9/4604 |
| 2018/0120851 A1* | 5/2018 | Shin | B60W 30/06 |

FOREIGN PATENT DOCUMENTS

| | | |
|---|---|---|
| KR | 20-0443715 Y1 | 3/2009 |
| KR | 10-2015-0027527 A | 3/2015 |
| KR | 10-1501598 B1 | 3/2015 |
| KR | 10-1535773 A | 7/2015 |
| KR | 10-2016-0079512 A | 7/2016 |

\* cited by examiner

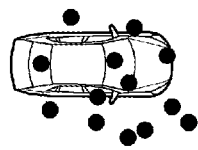 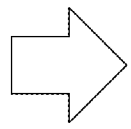 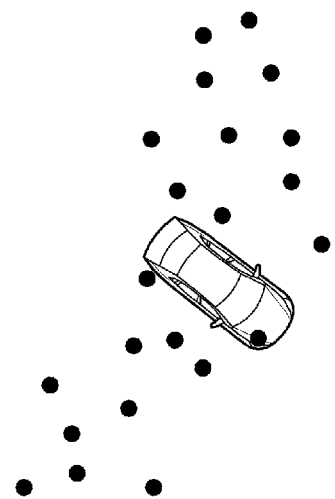
Motion update
FIG.9A　　　　　　　　　　FIG.9B

APPARATUS AND METHOD FOR ESTIMATING POSITION OF VEHICLE

CROSS-REFERENCE TO RELATED APPLICATION

The present application claims priority to Korean Patent Application No. 10-2016-0170668, filed on Dec. 14, 2016, the entire contents of which is incorporated herein for all purposes by this reference.

BACKGROUND OF THE INVENTION

Field of the Invention

The present invention relates to an apparatus and a method for estimating a position of a vehicle.

Description of Related Art

A parking control system of a vehicle determines a position of the vehicle using a map of a corresponding parking lot and secures a parking space to park the vehicle when entering the parking lot.

As an example, the parking control system matches a structure in the parking lot, e.g., a pillar or a parking slot, with the map of the parking lot to determine a present position of the vehicle.

However, in a case that another vehicle is parked in the parking slot to cover lines of the parking slot or the pillar of the parking lot is covered by another vehicle parked in the parking lot, it is difficult for the parking control system to recognize the parking slot or the pillar, and thus it is not easy to utilize the map information related to the parking lot when parking.

Meanwhile, in a case that the parking control system fails to recognize the parking slot or the pillar since they are covered, the parking control system extracts a center point of another vehicle parked in the parking slot to match the extracted result with information related to the parking slot. However, in many cases, other vehicles do not park to correctly match with the parking slot, and thus an error occurs in estimating the present position on the map of the parking lot using the center point of another vehicle in the parking control system.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for estimating a position of a vehicle, which are configured for detecting an accurate position of the vehicle in a parking lot by estimating the position of the vehicle based on a mileage in the parking lot and a steering angle of the vehicle, detecting a pillar, a parking slot, and a parked vehicle, etc., using a sensor to map the detected object to a parking lot map, giving a weight to a mapped object based on a mapping accuracy of the mapped object, and estimating the position of the vehicle by taking into account the given weight.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a vehicle position estimating apparatus includes a position estimation device that maps objects, which are recognized by a sensor of a vehicle and located around the vehicle, to a parking lot map and estimates a position of the vehicle based on movement information related to the vehicle, a weight setting device that predicts a mapping accuracy of the objects using a detected result of a landmark mapped to the parking lot map by the sensor and gives a weight to each particle corresponding to an interest point of each object based on the predicted mapping accuracy of the objects, and a position correction device that corrects the estimated position of the vehicle using the each weighted particle.

The position estimation device estimates a probability value of the each particle corresponding to the characteristic of the object using a particle filter and estimates the position of the vehicle based on the estimated probability value of the each particle.

The weight setting device determines a covariance of particles corresponding to the interest point of the object and gives the weight to the each particle based on the determined covariance.

The weight setting device gives a relatively high weight to particles corresponding to the interest point of the object in which the covariance is relatively small, and the covariance becomes smaller as the mapping accuracy of the object becomes higher.

The object includes at least one of a pillar or a parking slot, which are located in a parking lot, and the weight given to particles corresponding to an interest point of the pillar is higher than the weight given to particles of the parking slot.

The weight setting device compares a distance between the position of the vehicle and the landmark with a value obtained by inverse determination of a distance between a position of the landmark mapped to the parking lot map and the each particle and gives a relatively high weight to the particle in which a position error is relatively small.

The position correction device re-samples the each weighted particle and removes a particle weighted smaller than a reference value.

The position correction device corrects the estimated position of the vehicle based on the weight given to the re-sampled particle.

The position estimation device re-estimates the position of the vehicle using the re-sampled particle.

The position estimation device estimates a probability value of the re-sampled particle using a particle filter and re-estimates the position of the vehicle by reflecting the weight given to the each particle to the probability value.

According to another aspect of the present invention, a vehicle position estimating method includes mapping objects, which are recognized by a sensor of a vehicle and located around of the vehicle, to a parking lot map to estimate a position of the vehicle based on movement information related to the vehicle, predicting a mapping accuracy of the objects using a detected result of a landmark mapped to the parking lot map by the sensor to give a weight to each particle corresponding to an interest point of each object based on the predicted mapping accuracy of the objects, and correcting the estimated position of the vehicle using the each weighted particle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 3, 4A, 4B, 5, 6A, 6B, 7A, 7B, 8A, 8B, 9A, and 9B are views illustrating an operation of a vehicle position estimation apparatus according to an exemplary embodiment of the present invention;

Figure 1:
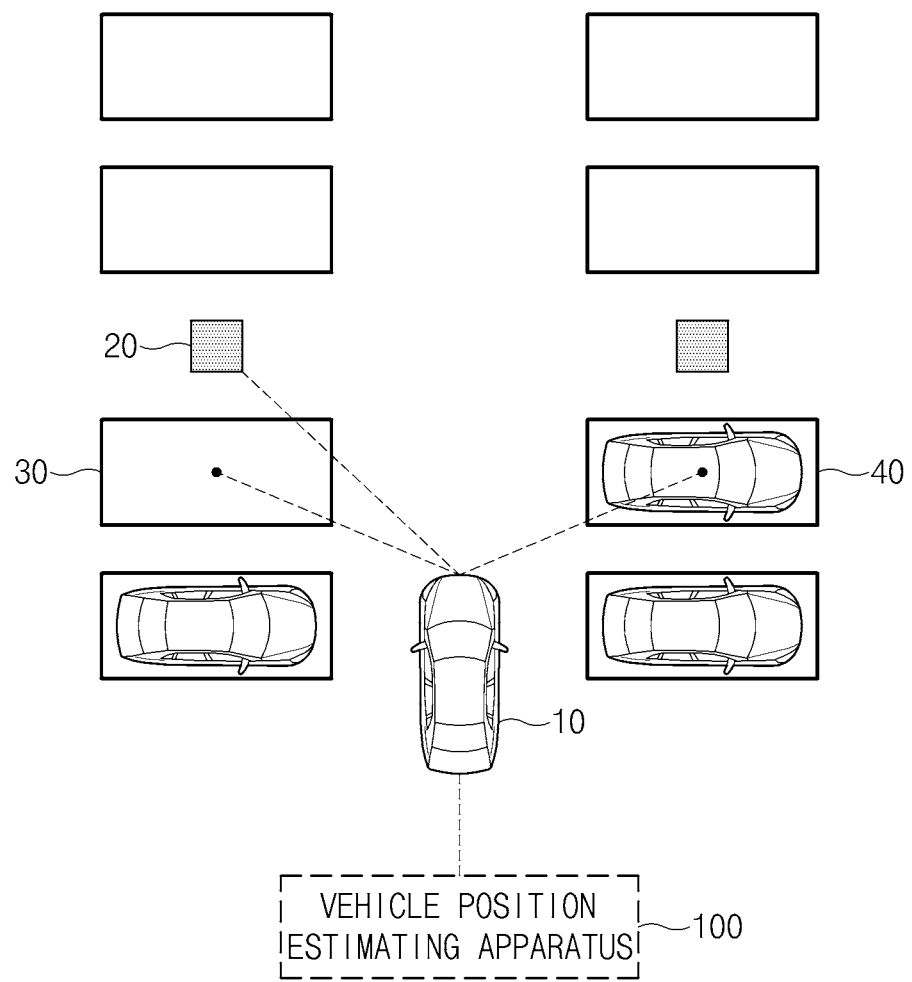
FIG. 1 is a view illustrating a vehicle to which a vehicle position estimating apparatus is applied according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In describing elements of exemplary embodiments of the present invention, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a vehicle to which a vehicle position estimating apparatus 100 is applied according to an exemplary embodiment of the present invention.

As shown in FIG. 1, when the vehicle 10 enters a parking lot, the vehicle position estimating apparatus 100 may recognize an accurate position of the vehicle 10 by detecting surrounding objects, e.g., a pillar 20, a parking slot 30, 40, etc., in the parking lot using sensors, mapping the detected objects to a parking lot map to estimate the position of the vehicle 10, and correcting the estimated position of the vehicle 10 based on a position of a fixed object including the pillar 20.

Here, the vehicle position estimating apparatus 100 may be implemented in the vehicle 10. In the instant case, the vehicle position estimating apparatus 100 may be integrally formed with internal control devices of the vehicle 10 or may be implemented as a separate apparatus and connected to control devices of the vehicle 10 by a connection device.

The configuration of the vehicle position estimating apparatus will be described in detail with reference to FIG. 2.

Figure 2:
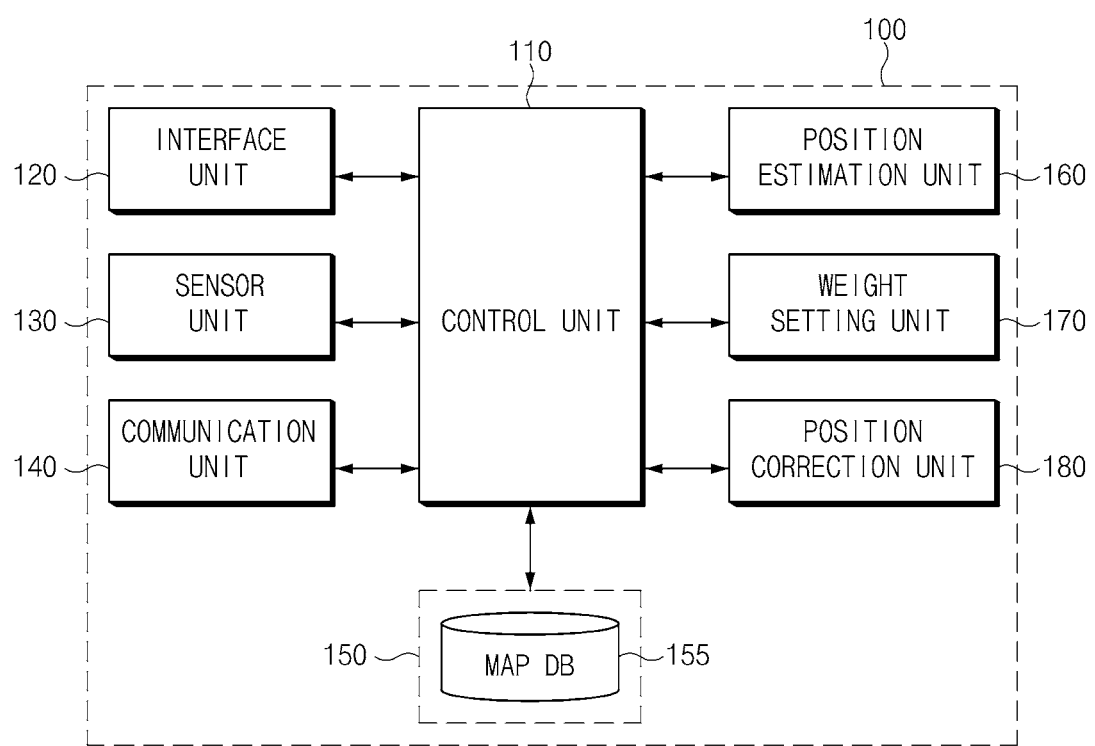
FIG. 2 is a block diagram illustrating a vehicle position estimating apparatus according to an exemplary embodiment of the present invention.

FIG. 2 is a block diagram illustrating the vehicle position estimating apparatus 100 according to an exemplary embodiment of the present invention.

Referring to FIG. 2, the vehicle position estimating apparatus 100 may include a control device 110, an interface device 120, a sensor 130, a communication device 140, a storage device 150, a position estimation device 160, a weight setting device 170, and a position correction device 180. The control device 110 may process signals transmitted between elements of the vehicle position estimating apparatus 100.

The interface device 120 may include an input device to receive a control instruction from a user and an output device to output an operation state of the vehicle position estimating apparatus 100 and estimated results.

Here, the input device may include a key button, a mouse, a joystick, a jog shuttle, a stylus pen, and the like. In addition, the input device may include a soft key implemented on a display.

The output device may include the display and a voice output device, including a speaker. In a case that a touch sensor, e.g., a touch film, a touch sheet, a touch pad, etc., is included in the display, the display operates as a touch screen, and the input device and the output device may be implemented in an integrated form.

In the instant case, the display may include at least one of a liquid crystal display (LCD), a thin film transistor-liquid crystal display (TFT-LCD), an organic light-emitting diode (OLED), a flexible display, a field emission display (FED), or a three-dimensional (3D) display.

The sensor 130 may include one or more sensors to sense objects in the vicinity of the vehicle and to measure a distance between the vehicle and the objects. The sensors may sense the objects in the vicinity of the vehicle, e.g., a pillar, a parking slot, other vehicles parked around the vehicle, etc., in the parking lot and may measure position information related to the detected objects.

In the present embodiment, the sensor 130 may include a radar, a lidar, an ultrasonic wave sensor, or a laser scanner and may further include a camera that takes a picture of surroundings of the vehicle. The sensors should not be limited thereto or as long as the sensors may sense the objects and measure the distance.

The communication device 140 may include a communication module that supports a communication interface with electrical equipments and/or control devices included in the vehicle. Here, the communication module may include a module supporting a vehicle network communication including a controller area network (CAN) communication, a local interconnect network (LIN) communication, a flex-ray communication, etc.

In addition, the communication module may include a module for a wireless internet access or a module for a short range communication. In the instant case, the communication module may receive map information related to the parking lot from a server of the parking lot.

As a wireless internet technology, a wireless LAN (WLAN), a wireless broadband (Wibro), a Wi-Fi, a world interoperability for microwave access (Wimax), and the like may be used, and a Bluetooth, a ZigBee, an ultra-wideband (UWB), a radio frequency identification (RFID), an infrared data association (IrDA), and the like may be used as a short range communication technology.

The storage device 150 may store data and/or algorithms required to operate the vehicle position estimating apparatus 100.

The storage device 150 may store characteristic information and position information related to the objects detected by the sensors of the sensor 130. In addition, the storage device 150 may include a map DB 155 in which parking lot map information are stored. The parking lot map information may be received in advance through the communication device 140.

In addition, the storage device 150 may store instructions and/or algorithms to estimate the position of the vehicle, give a weight to particles extracted from the objects in the vicinity of the vehicle, and perform a re-sampling operation.

In the present embodiment, the storage device 150 may include a storage medium including a random access memory (RAM), a static RAM (SRAM), a read-only memory (ROM), a programmable ROM (PROM), an electrically erasable PROM, etc.

The position estimation device 160 may estimate an initial position of the vehicle when the vehicle enters the parking lot.

The position estimation device 160 may include a particle filter. As an example, the position estimation device 160 may determine a moving state of a specific object using the particle filter having N independent random variables as particles. Each of the particles may have a value equal to or greater than zero (0) and equal to or smaller than one (1), and the value of each of the particles may be a probability value.

Accordingly, the position estimation device 160 may decide the number of particles to initialize the particle filter.

When the objects in the vicinity of the vehicle, i.e., the pillar, the parking slot, and/or the other vehicles (hereinafter, referred to as a "parked vehicle") parked around the vehicle, are recognized by the sensors of the sensor 130, the position estimation device 160 may map corresponding objects to the parking lot map. In the instant case, the position estimation device 160 may estimate the position of the vehicle based on movement data of the vehicle, e.g., a mileage, a steering angle, etc.

In addition, the sensor 130 may sense a landmark mapped to the parking lot map using a laser scanner.

The weight setting device 170 may predict a mapping accuracy between the objects and the parking lot map based on the detecting result of the landmark mapped to the parking lot map by the sensors of the sensor 130 and may give the weight to a particle corresponding to an interest point of the corresponding object based on the mapping accuracy.

As an example, among the objects detected in the parking lot, a position of the pillar is fixed, and thus a probability of an error occurrence is lower than that of the parked vehicle. Accordingly, the weight setting device 170 may give the weight to the particles around the pillar, which is higher than that given to the particles around the parked vehicle.

In the instant case, the weight setting device 170 may determine a covariance of the particles of the interest point of the object and give a relatively high weight to the particles having a relatively high mapping accuracy using the determined covariance.

The weight setting device 170 may determine the weight based on the covariance of the particles of the interest point of the object using the following Equation 1.

$$w^{[k]} \simeq |2\pi Q|^{-1/2} \exp\{-\tfrac{1}{2}(z_t - \hat{z}^{[k]})^T Q^{-1}(z_t - \hat{z}^{[k]})\} \quad \text{Equation 1}$$

In Equation 1, $\omega[k]$ denotes a weight of a k-th particle, Q denotes the covariance, Zt denotes an observation value, $\hat{z}[k]$ denotes a prediction value of the k-th particle, and $Zt - \hat{z}[k]$ denotes a position error of the k-th particle.

Embodiments that give the weight to the particles will be described in detail with reference to FIG. 3, FIGS. 4A and 4B.

Figure 3:
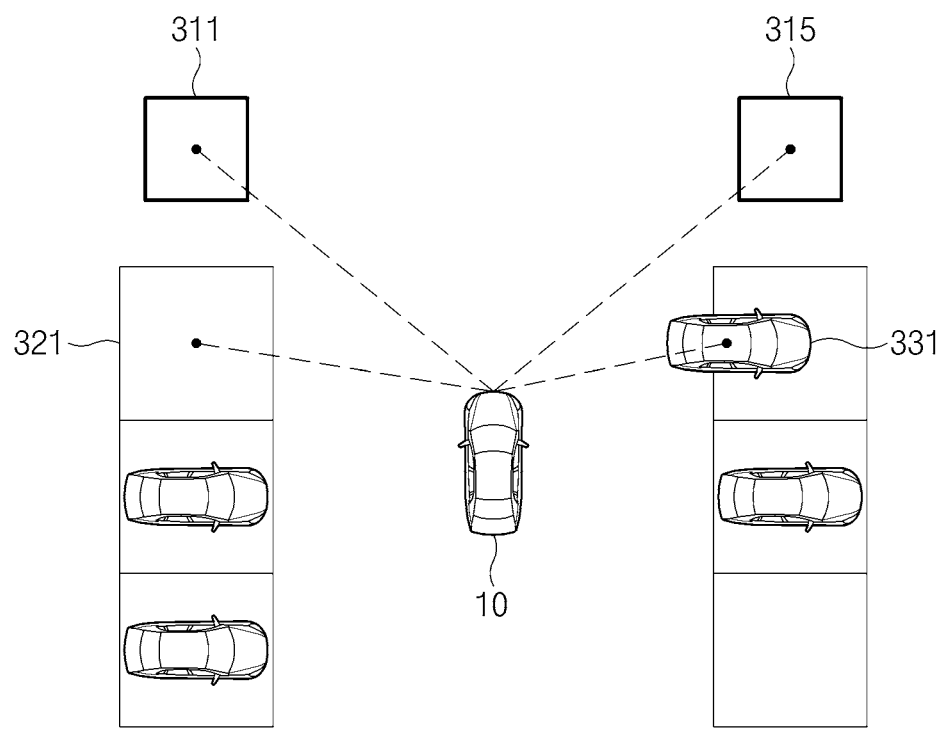

FIG. 3 shows an operation of the sensors of the sensor 130 that detects the objects in the parking lot, i.e., the pillars 311 and 315, the parking slot 321, and/or the parked vehicle 331. The sensors may extract a center point of the pillar, the parking slot, and/or the parked vehicle.

Figure 4A:
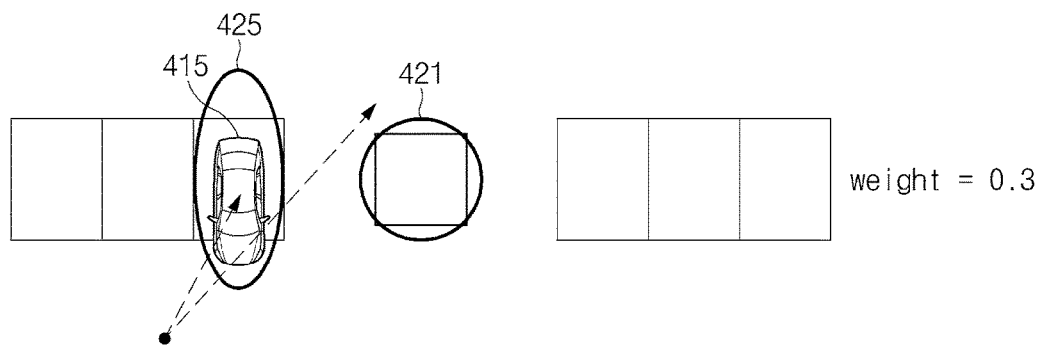
Figure 4B:
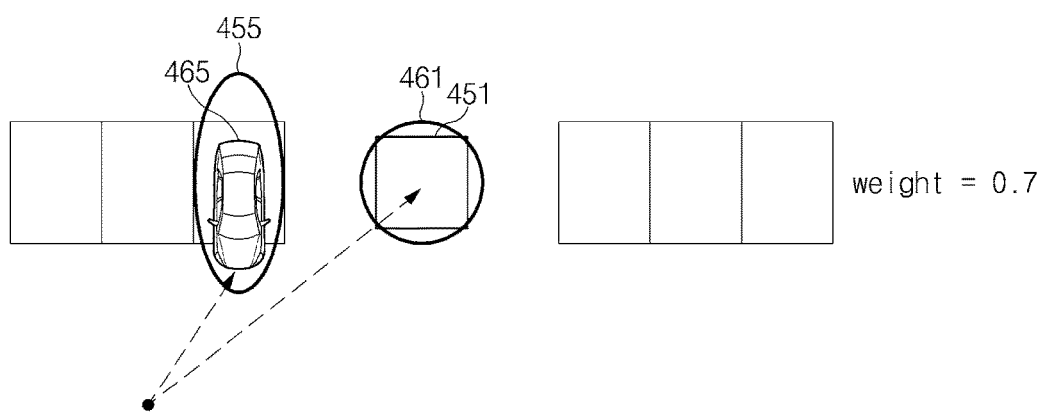

FIG. 4A and FIG. 4B show an exemplary embodiment that gives different weights depending on the detected object. In detail, FIG. 4A and FIG. 4B show an exemplary embodiment in which the weight is given to each of the pillar and the parking slot.

Referring to FIG. 4A and FIG. 4B, the accuracy in position of the pillar is higher than that of the parking slot or the parked vehicle. Accordingly, a relatively small covariance is given to the pillar having the high position accuracy, and a relatively large covariance is given to the parking slot.

In the instant case, the weight setting device 170 may give the relatively high weight to the particles detected from the pillar having the relatively small covariance through Equation 1.

In FIG. 4A shows a case in which the sensors of the vehicle do not recognize a pillar and recognize only the parking slot where a parked vehicle 415 is parked. That is, FIG. 4A shows an exemplary embodiment in which the weight is given to the particles of the parking slot using only a covariance 425 of the parking slot where the parked vehicle 415 is parked excluding a covariance 421 of the pillar.

As described above, in the case that only the parking slot is recognized by the sensors, the weight setting device 170 may give the weight of about 0.3 to the particles of the parking slot using the covariance 425 assigned to the particles of the parking slot.

Meanwhile, FIG. 4B shows a case in which the sensors of the vehicle recognize a pillar 451 and the parking slot where a parked vehicle 455 is parked, and a covariance 461 of the pillar 451 is smaller than a covariance 465 of the parking slot.

Accordingly, in the case that both the pillar 451 and the parking slot are recognized by the sensors, the weight setting device 170 may give the weight of about 0.7 to the particles of the pillar 451 using the covariance 461 assigned to the particles of the pillar 451 and give the weight of about 0.3 to the particles of the parking slot using the covariance 465 assigned to the particles of the parking slot.

Figure 5:
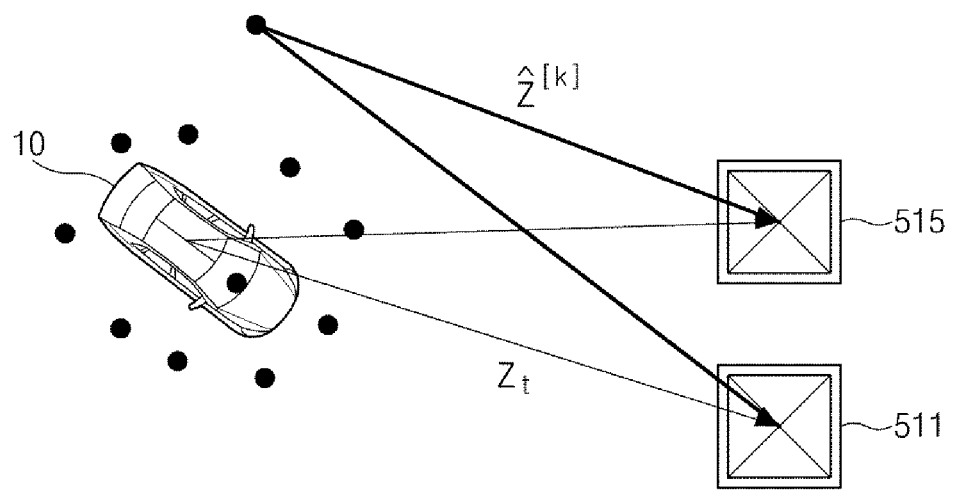

FIG. 5 shows a value Zt obtained by observing landmarks 511 and 515 at an actual position of a vehicle 10 and a predictive value ẑ at each particle. As shown in FIG. 5, a position error may occur between the value Zt obtained by observing landmarks 511 and 515 at the actual position of the vehicle 10 and the predictive value ẑ at each particle, and the position error may vary depending on the particles. Accordingly, the weight may be given to each particle based on the position error obtained by detecting the landmarks 511 and 515.

Hereinafter, a variation of the weight given to each particle by the detecting of the landmarks will be described with reference to FIGS. 6A and 6B.

Figure 6A:
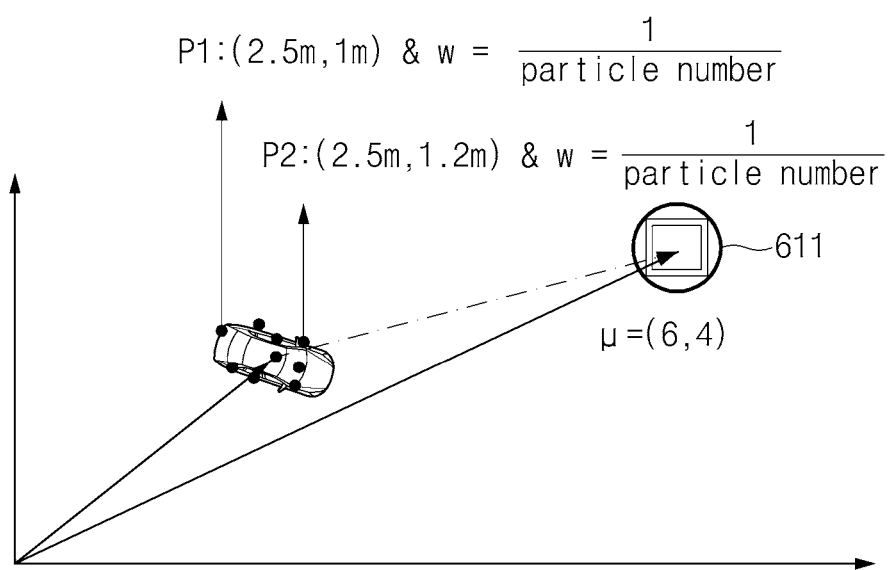

Referring to FIG. 6A shows a weight given to a first particle P1 and a weight given to a second particle P2 before a landmark 611 is sensed.

In FIG. 6A, position information related to the first particle P1 is about 2.5 m and about 1 m, i.e., (2.5 m, 1 m), and the weight w of the first particle P1 is obtained by dividing 1 by the number of particles, i.e., 1/the number of particles. In addition, position information related to the second particle P2 is about 2.5 m and about 1.2 m, i.e., (2.5 m, 1.2 m), and the weight w of the second particle P2 is obtained by dividing 1 by the number of particles, i.e., 1/the number of particles.

Figure 6B:
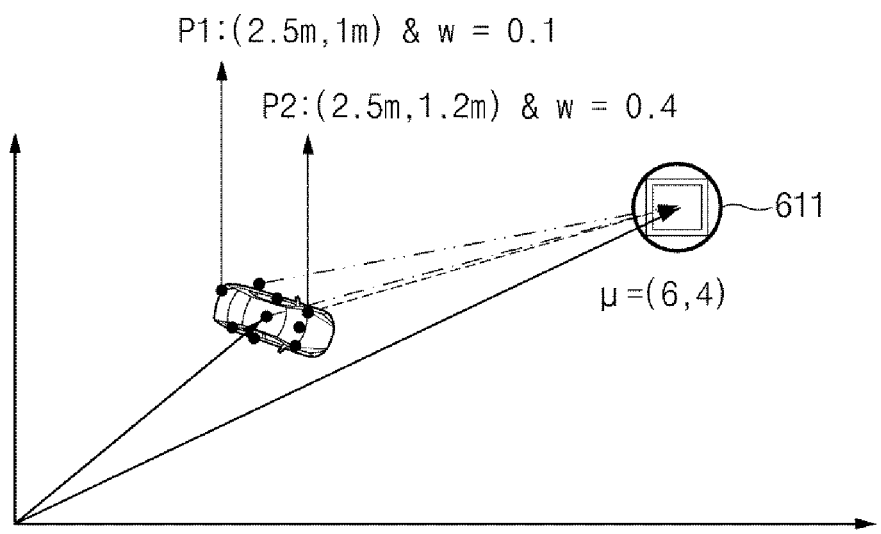

Meanwhile, FIG. 6B shows the variation of the weight given to the first particle P1 and the second particle P2 after the landmark 611 is sensed.

As shown in FIG. 6B, the weight of about 0.1 is given to the first particle P1, and the weight of about 0.4 is given to the second particle P2.

As described above, the weight setting device 170 may compare distance and angle information between the actual position of the vehicle and the landmark 611 with a value obtained by inverse determination of a distance between a position of the landmark 611 on the parking lot map to which the particles are mapped and each particle and may give the weight to the particles based on a difference between the compared results.

Accordingly, the weight given to the second particle P2 may be relatively higher than that given to the first particle P1 since a difference between the distance from the actual position of the vehicle to the landmark 611 and the value obtained by inverse determination of the distance from the landmark 611 to the second particle P2 is smaller than a difference between the distance from the actual position of the vehicle to the landmark 611 and the value obtained by inverse determination of the distance from the landmark 611 to the first particle P1.

The position correction device 180 may correct the position error of the vehicle using the weights respectively given to the particles by the weight setting device 170.

Figure 7A:
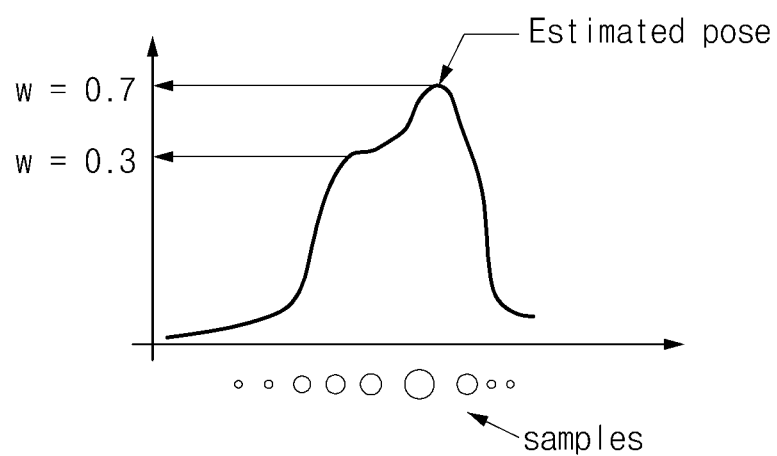
Figure 7B:
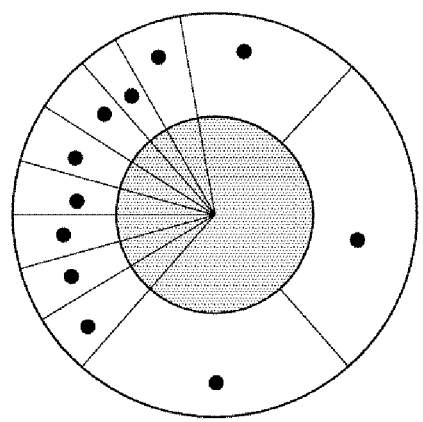

FIG. 7A shows a distribution of the particles by the weight, and FIG. 7B shows an operation of re-sampling each particle sample.

As shown in FIG. 7A and FIG. 7B, the position correction device 180 may perform the re-sampling operation using the weights respectively given to the particles and remove particles having a weight smaller than a predetermined reference value, and thus the position error may be minimized.

Accordingly, the position estimation device 160 may re-estimate the position of the vehicle using the particles re-sampled by the position correction device 180. In the instant case, the position estimation device 160 may estimate a probability value of the re-sampled particle using the particle filter and reflect the weights respectively given to the particles to the probability value, to re-estimate the position of the vehicle.

The operation of estimating the position of the vehicle using the re-sampled particles will be described with reference to FIGS. 8A and 8B.

Figure 8A:
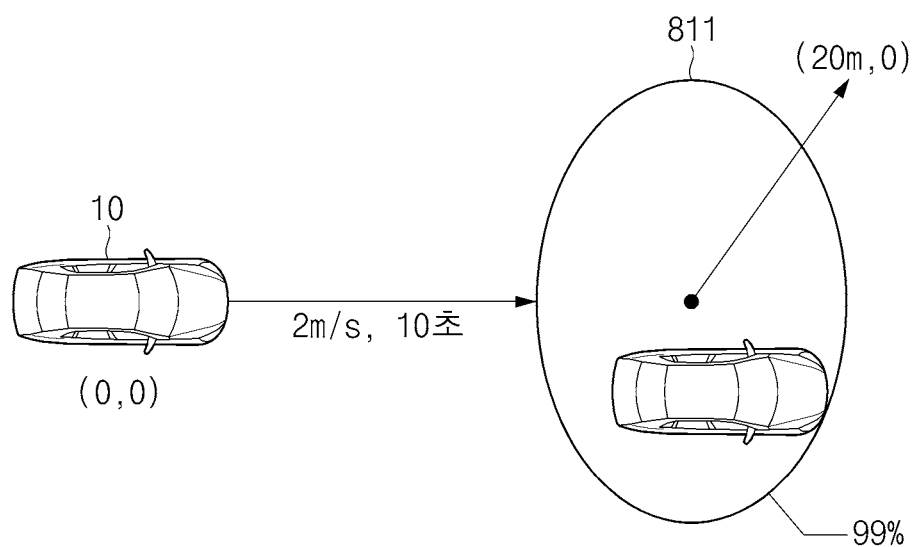

FIG. 8A shows an estimated result of the initial position of the vehicle, and a probabilistic position of the vehicle is estimated by the position estimation device 160 using the particle filter.

In a case that the vehicle 10 moves, the position estimation device 160 may estimate the position of the vehicle using an odometry system. In the instant case, since an odometry noise occurs around the moving vehicle as shown in FIGS. 9A and 9B, the position estimation device 160 may not estimate an accurate position of the vehicle due to the odometry noise occurring around the vehicle. Accordingly, as shown in FIG. 8A, the position of the vehicle is predicted to the extent that the vehicle is positioned within the ellipse, which is indicated by a reference numeral 811, with a probability of about 99%.

Figure 8B:
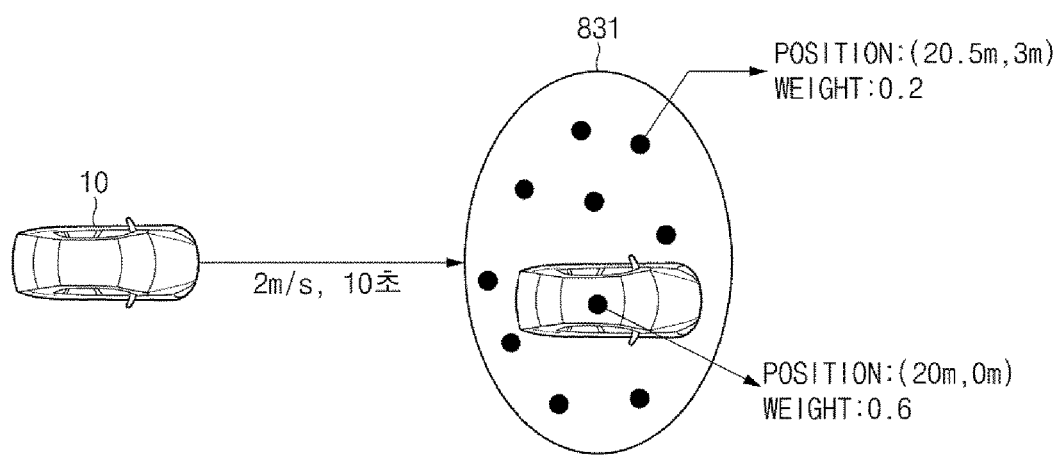

FIG. 8B shows a result of estimating the position of the vehicle using the re-sampled particles.

The re-sampled particles include weight information. Accordingly, the position estimation device 160 may verify the weight of each particle in a probabilistic ellipse indicated by a reference numeral 831 and estimate the position of the vehicle with respect to a position of the relatively high weighted particle.

In the instant case, the position of the vehicle may be more accurately estimated than the case in FIG. 8A.

As described above, the vehicle position estimating apparatus according to the exemplary embodiment of the present invention gives the relatively high weight to the particle of the object having the high position accuracy, e.g., the pillar, and estimates the position of the vehicle based on the given weight, and thus the position of the vehicle may be accurately estimated.

Hereinafter, the operation of the vehicle position estimating apparatus according to an exemplary embodiment of the present invention will be described in detail.

Figure 10:
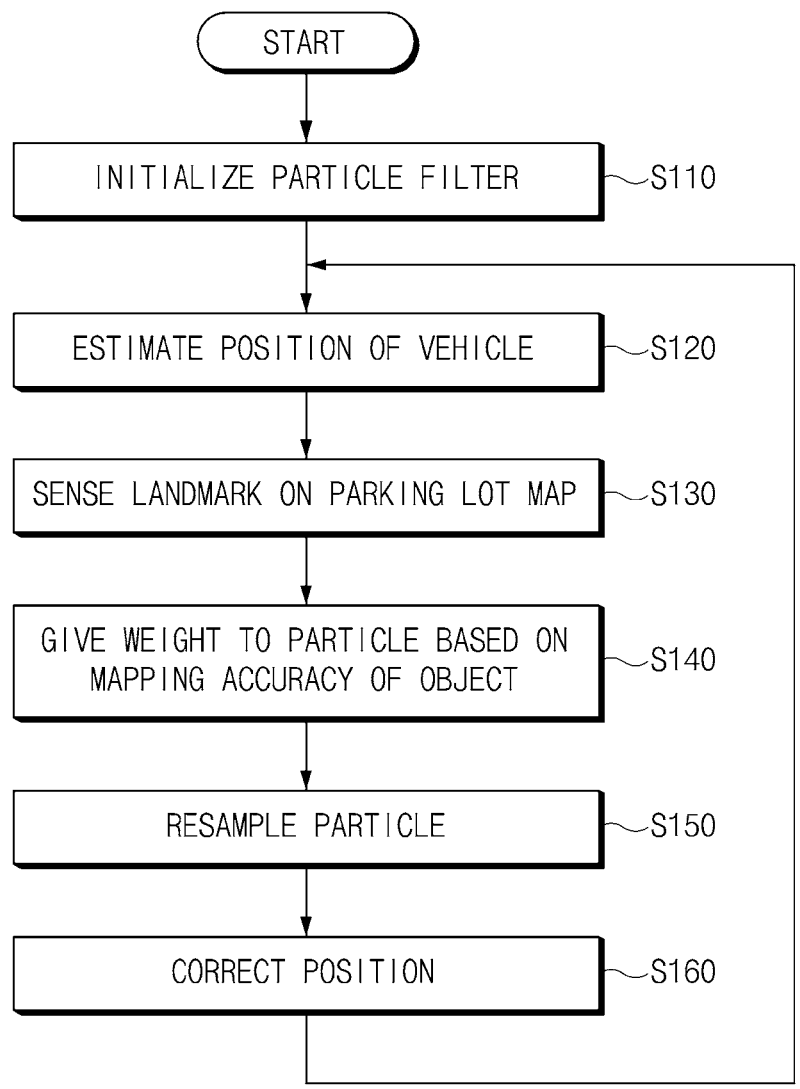
FIG. 10 is a flowchart illustrating a vehicle position estimating method according to an exemplary embodiment of the present invention.

FIG. 10 is a flowchart illustrating a method of estimating a position of a vehicle according to an exemplary embodiment of the present invention.

As shown in FIG. 10, the vehicle position estimating apparatus decides the number of particles to initialize the particle filter before estimating the position of the vehicle (S110).

The vehicle position estimating apparatus estimates the initial position of the vehicle (S120). In the instant case, the vehicle position estimating apparatus may sense the objects around the vehicle, i.e., the pillar, the parking slot, and/or the parked vehicle, using the sensors, map the detected objects to the parking lot map, and estimate the position of the vehicle based on the movement data of the vehicle, e.g., the mileage, the steering angle, etc.

As such, the vehicle position estimating apparatus detects the landmark mapped to the parking lot map (S130). The vehicle position estimating apparatus may give the weight to the particle corresponding to the interest point of the corresponding object based on the mapping accuracy between the object and the parking lot map (S140).

In operation S140, the vehicle position estimating apparatus may determine the covariance of the particles of the interest point of the object and give the relatively high weight to the particle having the high mapping accuracy using the determined covariance. As an example, the vehicle position estimating apparatus may give the relatively high weight to the particles of the interest point of the object, which has a low probability of error occurrence including the pillar.

When the weight is given to each particle, the vehicle position estimating apparatus re-samples each particle using the weight given to each particle (S150). In operation S150, the vehicle position estimating apparatus may remove the particles having the weight smaller than the predetermined reference value.

The vehicle position estimating apparatus may correct the position of the vehicle using the re-sampled particle in operation S150 (S160). Accordingly, the vehicle position estimating apparatus may correct the position of the vehicle using the particle to which the relatively high weight is given, and thus the vehicle position estimating apparatus may estimate the accurate position.

Operations S120 to S160 may be repeatedly performed until the vehicle leaves the parking lot or a separate request is received.

The vehicle position estimating apparatus operated as described above may be implemented as independent hardware or as at least one processor running on other hardware including a microprocessor, a general-purpose computer system, etc.

Figure 11:
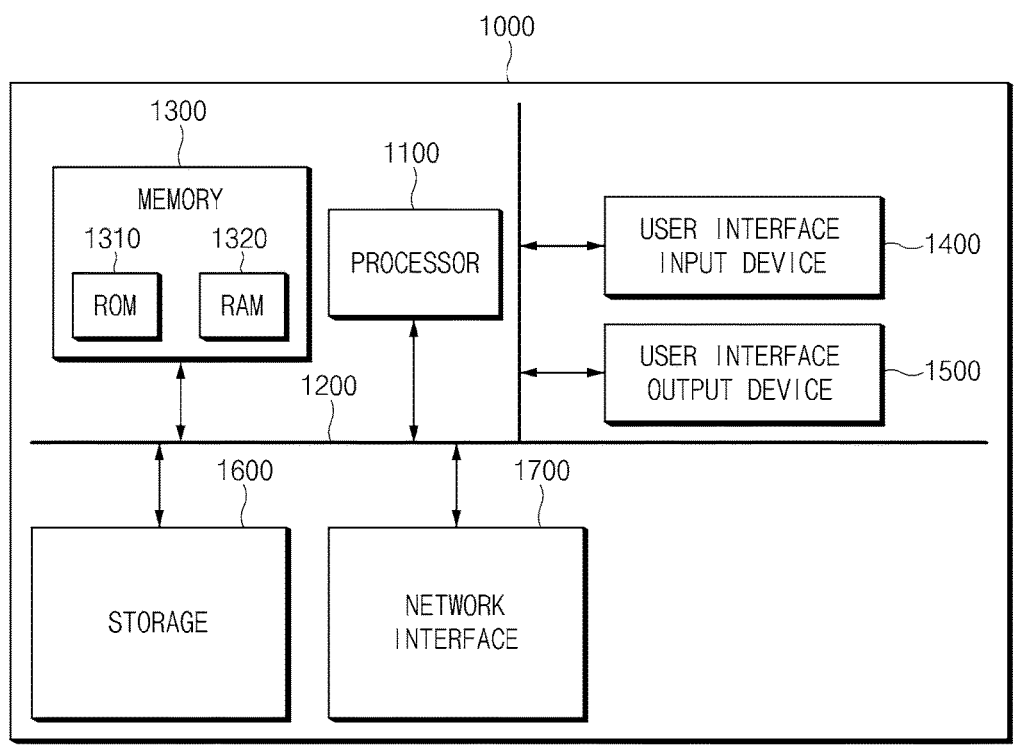
FIG. 11 is a block diagram illustrating a configuration of a computing system, to which a vehicle position estimating method is applied, according to another exemplary embodiment of the present invention.

FIG. 11 is a block diagram illustrating a configuration of a computing system 1000 to which a technique for estimating the position of the vehicle is applied, according to an exemplary embodiment of the present invention.

Referring to FIG. 11, the computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described with reference to the embodiments included in the specification may be directly implemented with a hardware module, a software module, or combinations thereof, executed by the processor 1100. The software module may reside on a storage medium (i.e., the memory 1300 and/or the storage 1600) including a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

According to the above, the position of the vehicle in the parking lot is accurately detected by estimating the position of the vehicle based on the mileage in the parking lot and the steering angle of the vehicle, detecting the pillar, the parking slot, and the parked vehicle to map the detected object to the parking lot map, giving the weight to the mapped object based on the mapping accuracy of the mapped object, and estimating the position of the vehicle by taking into account the given weight.

While the present invention has been described with reference to exemplary embodiments, it will be apparent to those skilled in the art that various changes and modifications may be made without departing from the spirit and scope of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle position estimating apparatus comprising:
   a memory configured to store program instructions; and
   a processor configured to execute the program instructions, the program instructions, when executed, configured for:
      a position estimation device configured to map objects, which are recognized by a sensor of a vehicle and located around the vehicle, to a parking lot map and estimate a position of the vehicle based on movement information related to the vehicle, wherein the objects include a pillar and a parking slot which are located in a parking lot;
      a weight setting device configured to predict a mapping accuracy of the objects using a detected result of a landmark mapped to the parking lot map by the sensor and give a weight to each particle corresponding to an interest point of each object based on the predicted mapping accuracy of the objects; and
      a position correction device configured to correct the estimated position of the vehicle using the each weighted particle,
   wherein the weight given to particles corresponding to an interest point of the pillar is higher than the weight given to particles of the parking slot.

2. The vehicle position estimating apparatus of claim 1, wherein the program instructions when executed are further configured to estimate a probability value of the each particle corresponding to a characteristic of the object using a particle filter and to estimate the position of the vehicle based on the estimated probability value of the each particle.

3. The vehicle position estimating apparatus of claim 1, to wherein the program instructions when executed are further configured to determine a covariance of particles corresponding to the interest point of the object and to give the weight to the each particle based on the determined covariance.

4. The vehicle position estimating apparatus of claim 3, wherein the program instructions when executed are further configured to give a relatively high weight to particles corresponding to the interest point of the object in which the covariance is relatively small, and the covariance becomes smaller as the mapping accuracy of the object becomes higher.

5. The vehicle position estimating apparatus of claim 1, wherein the program instructions when executed are further configured to compare a distance between the position of the vehicle and the landmark with a value obtained by inverse determination of a distance between a position of the landmark mapped to the parking lot map and the each particle and to give a relatively high weight to a particle in which a position error is relatively small.

6. The vehicle position estimating apparatus of claim 1, wherein the program instructions when executed are further configured to re-sample the each weighted particle and to remove a particle weighted smaller than a reference value.

7. The vehicle position estimating apparatus of claim 6, wherein the program instructions when executed are further configured to correct the estimated position of the vehicle based on the weight given to the re-sampled particle.

8. The vehicle position estimating apparatus of claim 6, wherein the program instructions when executed are further configured to re-estimate the position of the vehicle using the re-sampled particle.

9. The vehicle position estimating apparatus of claim 8, wherein the program instructions when executed are further configured to estimate a probability value of the re-sampled particle using a particle filter and to re-estimate the position of the vehicle by reflecting the weight given to the each particle to the probability value.

10. A vehicle position estimating method comprising:
mapping, by a processor objects recognized by a sensor of a vehicle and located around of the vehicle to a parking lot map to estimate a position of the vehicle based on movement information related to the vehicle, wherein the objects include a pillar and a parking slot which are located in a parking lot;
predicting, by the processor, a mapping accuracy of the objects using a detected result of a landmark mapped to the parking lot map by the sensor;
giving, by the processor, a weight to each particle corresponding to an interest point of each object based on the predicted mapping accuracy of the objects; and
correcting, by the processor, the estimated position of the vehicle using the each weighted particle,
wherein the giving the weight to the each particle includes:

giving, by the processor, higher weight to the particles corresponding to the interest point of the pillar than the weight given to particles of the parking slot.

11. The method of claim 10, wherein the estimating the position of the vehicle includes:
estimating, by the processor, a probability value of the each particle corresponding to the interest point of the object using a particle filter; and
estimating, by the processor, the position of the vehicle based on the estimated probability value of the each particle.

12. The method of claim 10, wherein the giving the weight to the each particle includes:
determining, by the processor, a covariance of particles corresponding to the interest point of the object; and
giving, by the processor, the weight to the each particle based on the determined covariance.

13. The method of claim 12, wherein the giving the weight to the each particle includes:
giving, by the processor, a relatively high weight to particles corresponding to the interest point of the object in which the covariance is relatively small.

14. The method of claim 10, wherein the giving the weight to the each particle includes:
comparing, by the processor, a distance between the position of the vehicle and the landmark with a value obtained by inverse determination of a distance between a position of the landmark mapped to the parking lot map and the each particle; and
giving, by the processor, a relatively high weight to a particle in which a position error is relatively small.

15. The method of claim 10, wherein the correcting the estimated position of the vehicle includes:
re-sampling, by the processor, the each weighted particle to remove a particle weighted smaller than a reference value.

16. The method of claim 15, wherein the correcting the estimated position of the vehicle includes:
correcting, by the processor, the estimated position of the vehicle based on the weight given to the re-sampled particle.

17. The method of claim 15, further including:
re-estimating, by the processor, the position of the vehicle using the re-sampled particle.

18. The method of claim 17, wherein the re-estimating the position of the vehicle includes:
estimating, by the processor, a probability value of the re-sampled particle using a particle filter; and
re-estimating, by the processor, the position of the vehicle by reflecting the weight given to the each particle to the probability value.

* * * * *